(12) United States Patent
Schmitt

(10) Patent No.: US 6,240,994 B1
(45) Date of Patent: Jun. 5, 2001

(54) METHOD OF MOUNTING A TIRE ON A RIM AND DEVICE FOR USE IN SAID METHOD

(75) Inventor: Ludovic Schmitt, Sayat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/458,759

(22) Filed: Dec. 10, 1999

(30) Foreign Application Priority Data

Dec. 11, 1998 (FR) .................................................. 98 15729

(51) Int. Cl.⁷ ............................ B27H 7/00; B60C 25/135
(52) U.S. Cl. ............................................. 157/1; 157/1.24
(58) Field of Search ............................. 157/1, 1.1, 1.17, 157/1.22, 1.24

(56) References Cited

U.S. PATENT DOCUMENTS

| | | |
|---|---|---|
| 1,482,304 | 1/1924 | Hoag . |
| 2,463,071 | 3/1949 | Vanleirsberghe . |
| 3,267,983 | * 8/1966 | Furrer .................................. 157/1.24 |
| 3,742,999 | * 7/1973 | Myers, Jr. ............................ 157/1.24 |
| 5,836,366 | 11/1998 | Muhlhoff . |

FOREIGN PATENT DOCUMENTS 587978   4/1925   (FR) .

* cited by examiner

*Primary Examiner*—Eileen P. Morgan
*Assistant Examiner*—Joni B. Danganan
(74) *Attorney, Agent, or Firm*—Baker Botts L.L.P.

(57) ABSTRACT

A method of mounting a tire on a rim and a device for use in the method. The method includes extracting a bead from a mounting groove of the rim, so as to bring it axially outside a seat of said rim, with a view to subsequently mounting that bead on the seat, the other bead having been mounted on another seat. The method further includes bringing the bead into a local extraction position, radially and axially outside the seat, and of extracting the bead on the whole circumference of the tire, by pivoting a bead gripper on two pins provided radially on both sides of the mounting groove of the rim. The device includes a bead gripper pivotally mounted on one of the pins which is mobile and coupled to a control through a rod which is pivoted on the other pin.

13 Claims, 2 Drawing Sheets

METHOD OF MOUNTING A TIRE ON A RIM AND DEVICE FOR USE IN SAID METHOD

BACKGROUND OF THE INVENTION

The present invention concerns a method of mounting a tire on a rim and a device for use in said method. More precisely, said rim is such that on its peripheral flanges it has seats, respectively, intended to receive the tire beads.

In relation to FIGS. 1 and 2 presented below, such a rim 30 has the following characteristics.

On its two peripheral projections 31, it has first and second rim seats 32 inclined outward and respectively intended to receive first and second beads 21 of the tire 20 (only the corresponding first projection 31, first seat 32 and bead 21 are shown). Provided between the seats 32, on one side, there is a bearing 33 intended to receive a support 22 for the tread 23 for said tire 20 and, on the other side, there is amounting groove 34 connecting said bearing 33 to an axially inner flange 32a of said first seat 32.

In the course of the present specification, the seat adjacent to the groove 34 will be referred to by convention as first seat 32 and the seat opposite said groove 34 will be called second seat.

As for the axially outer flange of the seat 32, it is formed by the corresponding peripheral projection 31.

In a known manner, mounting of the tire 20 on said particular rim 30 is carried out as follows.

The first bead 21 is presented on the rim 30, on the side of the second seat, and said first bead 21 is then slid axially on the bearing 33, so as to insert it in the groove 34. Said second bead is then mounted on the second seat.

Next, in an extraction stage, the first bead 21 is extracted from the groove 34, so as to bring it axially outside the projection 31 of the first seat 32.

Finally, in a mounting stage, that first bead 21 is mounted on the first seat 32.

In order to use said extraction stage, one proceeds manually in the usual manner by means of lever type tools, so as to progressively extract the first bead 21 from the groove 34.

One major disadvantage of this procedure which is described in U.S. Pat. No. 5,836,366, resides in the relatively long time that extraction takes on the whole circumference of the tire and, consequently, the inadequacy of said method for series fabrication of mounted assemblies incorporating that type of rim.

SUMMARY OF THE INVENTION

One object of the present invention is to propose a method of mounting a tire on a rim, said rim having on each of its two peripheral edges a rim seat intended to receive a bead of said tire, said rim including a bearing on one side, between its two seats, and, on the other side, a mounting groove connecting said bearing to an axially inner flange of one of said seats, or first seat, said method including presenting one of the beads of said tire on said rim and on the side of the other seat, or second seat, then moving that first bead axially along said bearing, so as to insert it in said groove, mounting the other bead, or second bead, on said second seat, and then, in an extraction stage, extracting said first bead from said groove, so as to bring it axially outside said first seat and, in a mounting stage, of mounting said first bead on said first seat, which makes it possible to fabricate series of mounted assemblies at a relatively fast rate without risk of altering the corresponding tires.

For this purpose, said extraction stage includes, in a first step, creating at least one local space between said first bead and said axially inner flange, in a second step, inserting a gripping means in said local space so that it occupies a support position on the inner face of said first bead, in a third step, pivoting said gripping means in said support position, so as to bring said first bead into a local extraction position, radially and axially outside said first seat, and in a fourth step, extracting said first bead on the whole circumference of said tire, the said second step including pivoting said gripping means on a first pivot pin situated radially outside said groove, so that said gripping means occupies said support position, and said third step includes controlling the pivoting of said gripping means in said support position under the control of a control means to which said gripping means is coupled, so that said gripping means pivots on a second pivot pin situated radially inside said groove.

According to another characteristic of the method of the invention, for the application of said first step, a localized site on the sidewall of said tire ending in said first bead is relied upon, so as to create said local space.

According to another characteristic of the method of the invention, for the application of said fourth step, said tire is rotated on its axis of rotation, said gripping means occupying the said local extraction position.

According to a first method of application of said fourth step, said tire and said rim are together integrally driven in rotation.

According to a second method of application of said fourth step, said inner face of said first bead is inserted at another point on the circumference of said tire, the appreciably flat base of an L-shaped curved lug, said tire, said rim and said gripping means being integrally driven in rotation relative to said lug.

Another object of the present invention is to propose a device for the extraction of said bead including a frame and a platform intended to receive said rim equipped with said tire perpendicular to the axis of rotation of the latter, a gripping means intended to bear on the first bead being pivotally mounted on a first pivot pin, mobile in relation to said frame and parallel to the plane of said platform, that device producing, on operation in series, the aforesaid result of a relatively fast rate of mounting.

For this purpose, said device is such that said gripping means is coupled, by means of a rod, to a control means provided to control the pivoting of said gripping means on a second pivot pin, mounted stationary on said frame and also parallel to the plane of said platform.

According to another characteristic of a device of the invention, said rod is hinged on said pivot pins.

Said gripping means is, for example, provided with an arm designed to activate it on pivoting, so that said gripping means appreciably forms the oblique branch of a "y" whose leg is formed by said arm, said first pivot pin being mounted at one end of said arm which is opposite the free end of said gripping means.

Said gripping means preferably has a curvature which allows centering of said first pivot pin.

Said gripping means advantageously has a tapered free end and beveled side edges in a mid-portion of said gripping means, where its radius of curvature is appreciably maximal.

According to one embodiment of the invention, said device includes a finger intended to bear on said tire, said finger being mounted along the side of said arm opposite that of said gripping means and also being controlled by said control means.

According to another characteristic of a device of the invention, said frame is equipped with locking means for locking said control means in said extraction position.

Said control means and/or said arm and/or said finger are advantageously provided, respectively, with jacks to activate them.

DESCRIPTION OF THE DRAWINGS

The aforesaid characteristics of the present invention, as well as others, will be better understood on reading the following description of an embodiment of the invention, given by way of illustration and nonlimitatively, said description relating to the attached drawings, in which.

DESCRIPTION OF PREFERRED EMBODIMENTS

Figure 1:
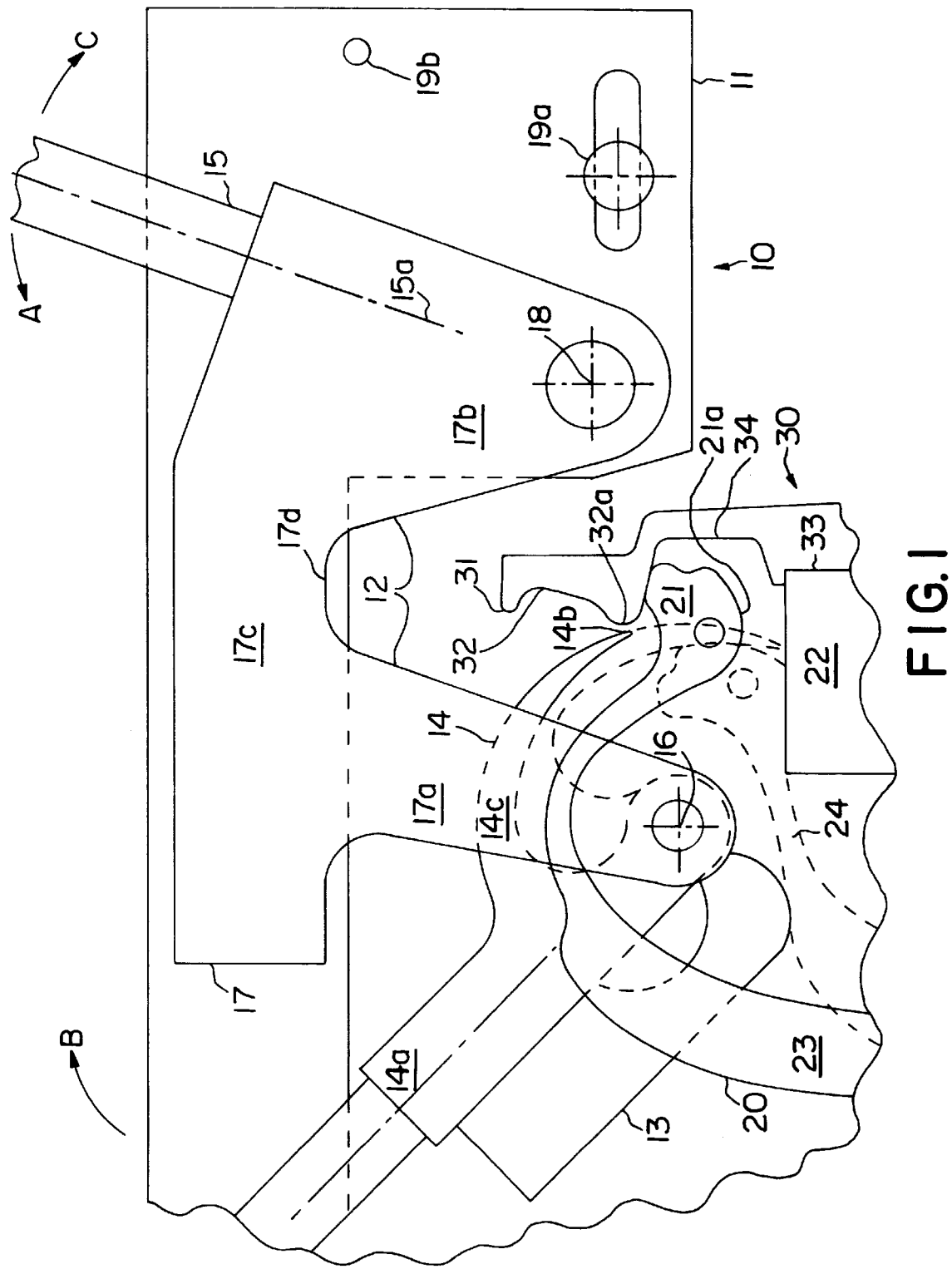
FIG. 1 is a schematic view of a part of a device according to the invention for the use in said extraction stage on mounting of said tire on said rim, said device and said tire being partially represented in a position of lodging in said groove and in an intermediate extraction position.

A device 10 according to the invention for the extraction of a tire 20 from said groove 34 of a rim 30 includes a frame 11, a platform (not represented in FIGS. 1 and 2), which is intended to receive the rim 30 equipped with a tire 20 perpendicular to the axis of rotation of the latter and is provided below said frame 11, and means 12 mounted on the frame 11 and designed to cooperate with said first bead 21 of the tire 20 for said extraction.

Said means 12 includes at least one finger 13, which is intended to bear on the sidewall 24 of the tire 20 ending in the first bead 21, a pivoting gripping means 14 intended to bear on the inner face 21a of said first bead 21, and a control means 15 provided to control the pivoting of said gripping means 14.

The gripping means 14 is pivotally mounted on a first pivot pin 16 parallel to the plane of said platform.

In this embodiment, the gripping means 14 is equipped with an arm 14a provided to activate it in pivoting, so that said gripping means 14 appreciably forms the oblique branch of a "y" whose leg would be formed by said arm 14a. As can be seen in FIG. 1, the first pivot pin 16 is mounted at one end of the arm 14a opposite the free end 14b of said gripping means 14.

In this same example, it can be seen that said finger 13 is mounted on the side of the arm 14a opposite that of the gripping means 14.

The gripping means 14 preferably has a curvature giving it a hook shape. That curvature appreciably allows centering of the first pivot pin 16, and the aforesaid free end 14b is tapered.

Furthermore, the side edges 14c of the gripping means 14 are preferably beveled, in a mid-portion of said gripping means 14. As can be seen in FIG. 1, this mid-portion presents an appreciably maximal radius of curvature.

The gripping means 14 is coupled to said control means 15 through a rod 17, so that it can be pivoted on a second pivot pin 18 under the control of said means 15, which is integral with the rod 17. Said second pin 18 is mounted fixed on the frame 11 parallel to the plane of said platform.

As for the rod 17, it is mounted, on one side, on said first pin 16 and, on the other, on said second pin 18. In the example of FIG. 1, that rod consists of two lugs 17a and 17b which are respectively mounted on said pins 16 and 18, and which are connected between them by a section 17c, so that said rod 17 presents a recess 17d between said lugs 17a and 17b giving it roughly a π shape.

In the example of FIG. 1, the control means 15 consists of an arm whose axis of symmetry 15a passes through said second pin 18.

A device 10 according to the invention also contains means 19a, 19b for locking the control means 15 in a given position. In this embodiment, the latter consist of two removable stops 19a and 19b.

This device 10 operates as follows, once the first bead 21 has been positioned in the groove 34, as represented by the solid line in FIG. 1 (the other bead being fitted into said second seat).

One begins by activating the finger 13 to exert a force on the sidewall 24 of the tire 20, tending to create a local space between this bead 21 and said axially inner flange 32a of the first seat 32. This locally spaced position of the bead 21 can be seen in dotted lines in FIG. 1.

In the example of FIG. 1, that activation is carried out by pivoting the control means 15 in the direction of arrow A. However, it is to be understood that other methods of activation of said finger 13 could be used.

It will also be understood that this finger 13 could be otherwise mounted, provided that it can bear on said sidewall 24 so as to create said local space.

While continuing to apply the said force, the arm 14a is then pivoted on the first pivot pin 16 in the direction of arrow B, so as to insert the gripping means 14 in said local space. In that insertion position, it can be seen that the end 14b of the gripping means 14 is radially inside the bead 21.

It will be observed that the tapered shape of said end 14b facilitates this insertion.

The exertion of said force on the sidewall 24 is then stopped, so that the gripping means 14 will bear, through its mid-portion, on the inner face 21a of the bead 21, as represented in dotted lines in FIG. 1, in a support position or intermediate extraction position.

It will be observed that the thick beveled structure of the mid-portion of the gripping means 14 is well suited to bearing on the bead 21 without deforming it.

Still in the example of FIG. 1, it will be observed that one stops exerting the said force via this pivoting of the arm 14a in the direction of arrow B.

The control means 15 is then pivoted on the second pivot pin 18 in the direction of arrow C, the gripping means 14 still occupying said support position, which also has the effect of pivoting said gripping means 14 on said pin 18 via the rod 17. This pivoting is interrupted when the gripping means 14 has reached the final local extraction position of FIG. 2.

Figure 2:
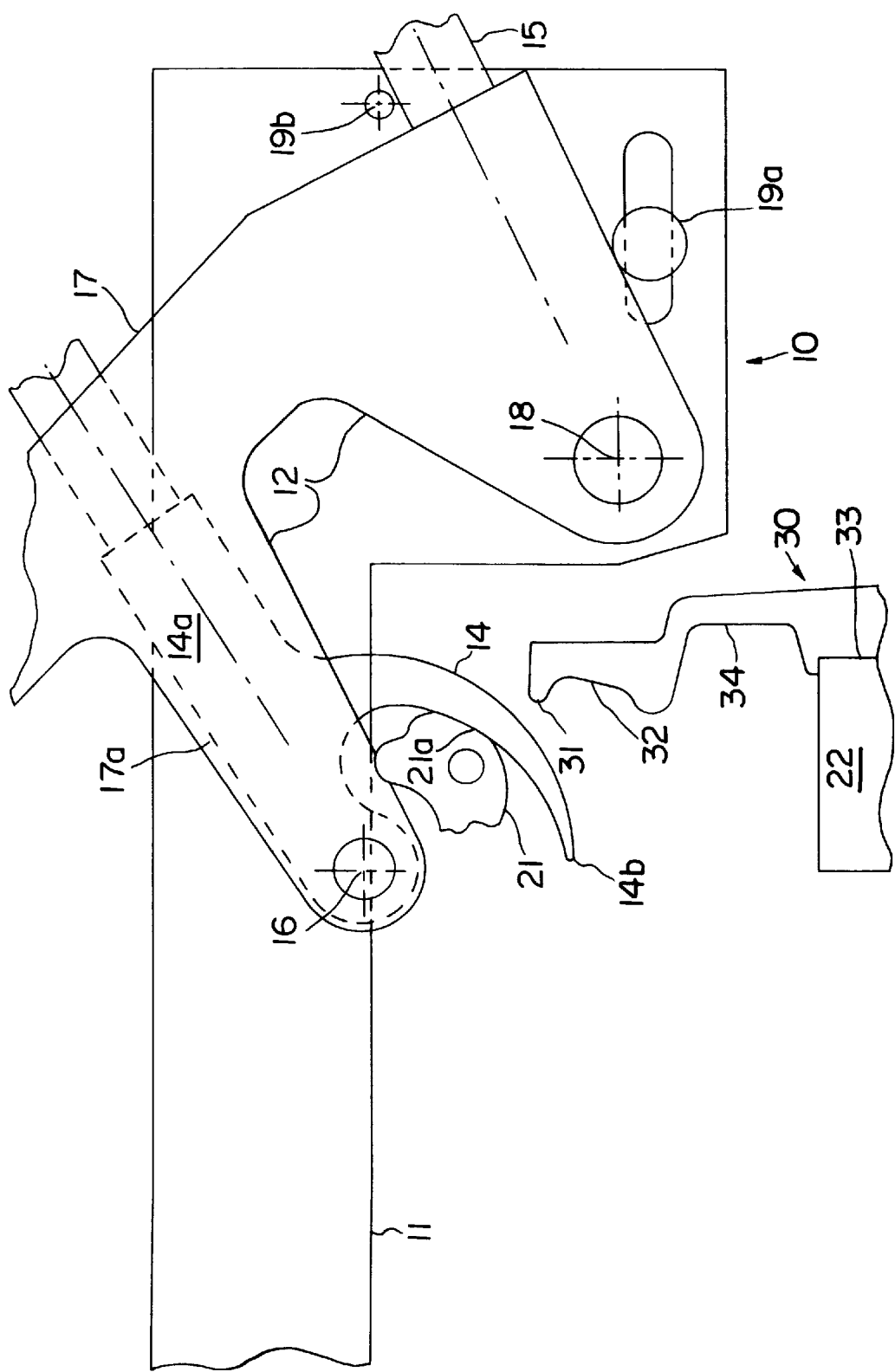
FIG. 2 is an also partial schematic view of the device of FIG. 1 in a final extraction position.

As can be seen in FIG. 2, this final position is such that the bead 21 then occupies a position radially and axially outside the corresponding seat 32.

One then proceeds with locking, in that final extraction position, of the control means 15 and, consequently, of the gripping means 14, via the stops 19a and 19b.

Then, according to a first embodiment, the platform is activated to turn on itself, so that the tire 20 and the rim 30 integrally turn on their axis of rotation, the extraction means 12 remaining stationary.

This rotation of the tire 20 and rim 30 has the effect, in a single revolution, of extracting the bead 21 on the whole circumference of the tire 20.

It will be observed that, on rotation of the tire 20 in contact with the gripping means 14, the aforesaid shape of the latter makes it possible to minimize satisfactorily the risks of deformation of the bead 21 which are inherent to that contact.

It will also be observed that said lug 17a of the rod 17 presents, in proximity to the free end of its inner edge intended to face the bead 21 extracted (position of FIG. 2), a suitable shape for not entering into contact with that bead 21 on the aforesaid rotation of the tire 20, in order not to obstruct the latter. For this purpose, that shape can be of locally reentrant type, rounded, for example, like the rear part (in dotted lines) of the gripping means 14 notably evident in FIG. 2.

According to a second embodiment, the roughly flat face of an L-shaped curved lug (not represented) is inserted under the inner face 21a of the bead 21, at a point on the circumference of the tire 20 other than where the gripping means 14 is located in the extraction position of FIG. 2. The said platform is then activated in rotation on its pin, in order to drive the tire 20, the rim 30 and the gripping means 14 integrally in rotation, only said L-shaped lug remaining stationary.

This rotation of the tire 20 also has the effect, in a single revolution, of extracting the bead 21 on the whole circumference of the tire 20.

It will be observed that, in this second embodiment, the tire 20 turns only in contact with the flat base of the L-shaped lug and remains stationary relative to the gripping means 14. This roughly "flat" contact results in an additional minimization of the aforesaid deformation risks.

The bead 21 being extracted, the operation of mounting the tire 20 on the rim 30 is completed, proceeding with mounting of that rim 21.

It will also be observed that a device 10 according to the invention, for use of the entire stage of extraction of the bead 21, could advantageously contain jacks respectively provided to activate the said control means 15 and/or said arm 14a and/or said finger 13.

I claim:

1. A method of mounting a tire on a rim, said rim including on each of its two peripheral edges a rim seat for receiving a bead of said tire, said rim including a bearing on one side, between the two seats, and, on the other side, a mounting groove between said bearing and an axially inner flange adjacent one of said seats, hereinafter referred to as the first seat, said method including presenting a first bead of said tire on said rim on the side of the other seat, hereinafter referred to as the second seat, then moving the first bead axially along said bearing, so as to insert it in said groove, mounting the other bead, hereinafter referred to as the second bead, on said second seat, and then, in an extraction stage, extracting said first bead from said groove, so as to bring it axially outside said first seat and, in a mounting stage, mounting said first bead on said first seat, characterized in that said extraction stage includes, in a first step, creating at least one local space between said first bead and said axially inner flange, in a second step, inserting a gripping means in said local space so that it occupies a support position on the inner face of said first bead, in a third step, pivoting said gripping means in said support position, so as to bring said first bead into a local extraction position, radially and axially outside said first seat, and, in a fourth step, extracting said first bead on the whole circumference of said tire, the second step including pivoting said gripping means on a first pivot pin situated radially outside said groove, so that said gripping means occupies said support position, and said third step includes controlling the pivoting of said gripping means in said support position under the control of a control means to which said gripping means is coupled, so that said gripping means pivots on a second pivot pin situated radially inside said groove.

2. A method of mounting according to claim 1, including in the application of said first step, bearing on a localized site on a sidewall of said tire above said first bead, so as to create said local space.

3. A method of mounting according to claim 1, including, in the application of said fourth step, rotating said tire on its axis of rotation, said gripping means occupying said local extraction position.

4. A method of mounting according to claim 3, in which, in the application of said fourth step, said tire and said rim are together integrally driven in rotation.

5. A method of mounting according to claim 3, in which, in the application of said fourth step, said tire and said gripping means are integrally driven in rotation.

6. A device for the use in said extraction stage of the method according to claim 1, said device comprising a frame, a platform for receiving said rim equipped with said tire perpendicular to the axis of rotation of the latter, the gripping means for bearing on the inner face of said first bead, said gripping means being pivotally mounted on said first pivot pin so as to be movable in relation to said frame and parallel to a plane of said platform, and the control means coupled through a rod to the gripping means for pivoting said gripping means on the second pivot pin, the second pin being mounted fixed on said frame and also parallel to the plane of said platform.

7. A device according to claim 6, in which said rod is hinged on said pivot pins.

8. A device according to claim 6, in which said gripping means is provided with an arm to pivotally activate it on said first pin, so that said gripping means appreciably forms the oblique branch of a "y" whose leg is formed by said arm, said first pivot pin being mounted at one end of said arm which is opposite a free end of said gripping means.

9. A device according to claims 8, including a finger for bearing on said tire, said finger being mounted along the side of said arm of the gripping means opposite that of said gripping means and also being controlled by said control means.

10. A device according to claim 9, including means for activating said arm and said finger.

11. A device according to claims 6, in which said gripping means has a curvature which allows centering of said first pivot pin.

12. A device according to claim 11, in which said gripping means has a tapered free end and beveled side edges in a mid-portion of said gripping means, where its radius of curvature is appreciably maximal.

13. A device according to one claim 6, in which said frame is provided with locking means for locking said control means in said extraction position.

* * * * *

UNITED STATES PATENT AND TRADEMARK OFFICE
CERTIFICATE OF CORRECTION

PATENT NO.   : 6,240,994 B1
DATED        : June 5, 2001
INVENTOR(S)  : Schmitt

Page 1 of 1

It is certified that error appears in the above-identified patent and that said Letters Patent is hereby corrected as shown below:

<u>Column 6,</u>
Line 46, "claims" should read -- claim --.
Line 53, "claims" should read -- claim --.
Line 60, "one" should be deleted.

<u>Column 1,</u>
Line 18, "amounting" should read -- a mounting --.

Signed and Sealed this

Second Day of April, 2002

Attest:

JAMES E. ROGAN
*Attesting Officer*   *Director of the United States Patent and Trademark Office*